United States Patent
Flechsig et al.

(12)

(10) Patent No.: US 6,265,846 B1
(45) Date of Patent: Jul. 24, 2001

(54) ACTIVE BYPASS CIRCUIT FOR EXTENDING ENERGY CAPACITY AND OPERATIONAL LIFE OF A MULTI-CELL BATTERY

(75) Inventors: Karl A. Flechsig, Los Gatos; Donald Ray Gillis, San Jose, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/677,958

(22) Filed: Oct. 3, 2000

(51) Int. Cl.$^7$ .......................... H01M 10/46; H01M 10/44
(52) U.S. Cl. .............................................. 320/116
(58) Field of Search .................................. 320/116, 117, 320/118, 119, 122

(56) References Cited

U.S. PATENT DOCUMENTS

| | | |
|---|---|---|
| 3,315,140 | 4/1967 | Dadin . |
| 4,316,185 | 2/1982 | Watrous et al. . |
| 4,823,086 | 4/1989 | Whitmire et al. . |
| 4,931,738 | 6/1990 | MacIntyre et al. . |
| 5,349,535 | 9/1994 | Gupta . |
| 5,543,245 | 8/1996 | Andrieu et al. . |
| 5,546,003 | 8/1996 | Noworolski et al. . |
| 5,805,068 | 9/1998 | Bradus . |
| 5,880,575 * | 3/1999 | Itou et al. .......................... 320/122 |
| 5,998,967 * | 12/1999 | Umeki et al. ...................... 320/122 |
| 6,121,752 * | 9/2000 | Kitahara et al. ................... 320/122 |
| 6,133,710 * | 10/2000 | Okamura ........................... 320/122 |

OTHER PUBLICATIONS

Balliet, L., Kraus, R., "Dynamic Rechargeable Battery End-of-Life Prediction," IBM Technical Disclosure Bulletin, Jun. 1986, pp. 352–356, vol. 29, No. 1, IBM Corp. 1986.

* cited by examiner

*Primary Examiner*—Edward H. Tso
(74) *Attorney, Agent, or Firm*—Robert B. Martin; Bracewell & Patterson, L.L.P.

(57) ABSTRACT

An active bypass circuit for use with a battery pack having a plurality of cells and method of operation thereof. The active bypass circuit includes a first switching device that is series-coupled with a cell in the battery pack (a separate active bypass circuit is utilized for each cell in the battery pack). A second switching device is parallel-coupled across the first switching device and the cell. The first and second switching devices are switched, i.e., turned ON and OFF, in a complementary fashion. The active bypass circuit also includes a monitoring circuit for monitoring an electrical characteristic of the cell and generating a switching control signal, in response to the monitored electrical characteristic, to selectively control the operation of the first and second switching devices. In an advantageous embodiment, the electrical characteristic is a voltage across the cell. In a related embodiment, the active bypass circuit also includes a switching driver circuit that receives the switching control signal from the monitoring circuit and generates, in response thereto, complementary first and second switching signals to the first and second switching devices, respectively.

19 Claims, 2 Drawing Sheets

ACTIVE BYPASS CIRCUIT FOR EXTENDING ENERGY CAPACITY AND OPERATIONAL LIFE OF A MULTI-CELL BATTERY

BACKGROUND OF THE INVENTION

1. Technical Field

The present invention relates in general to power supplies and, in particular, to a battery pack having a number of individual series-connected cells that combine to produce a particular supply voltage. More specifically, the present invention relates to an active bypass circuit for extending energy capacity and operational life of a multi-cell battery.

2. Description of the Related Art

A battery is typically an electrochemical device that converts chemical energy into electrical current utilizing one or more galvanic cells. A galvanic cell is a fairly simple device that consists of two electrodes, i.e., an anode and a cathode, typically immersed in an electrolyte solution. The amount of energy, i.e., voltage and current, that a galvanic cell generates is directly related to the types of materials employed in the electrodes and electrolyte. The length of time that the cell can maintain a particular voltage and current is related to the amount of active material utilized in the cell and the cell's design.

A key parameter for a battery cell is its capacity, generally stated in ampere hours, or milliampere hours. The capacity of the battery cell is a variable that changes depending on discharge rate, charge rate, temperature, age and number of charge/discharge hours. Cell voltage also varies as a function of temperature, discharge rate and discharge status, i.e., percent of discharge.

A battery cell's voltage profile is the relationship of its output voltage to the amount of time that the battery cell has been discharging, e.g., when connected to a load device, or charging. Generally, in most battery cells, the voltage will reduce steadily as the chemical reactions in the cell are diminished. In the case of nickel-cadmium (Ni—Cd) cells, the output voltage is a relatively flat voltage profile. A Ni—Cd cell's voltages will typically remain constant over approximately two-thirds of the cell's discharge cycle. At some point near the end of the cell's discharge cycle, the cell's voltage will drop sharply to nearly zero volts. This requires that the cell will have to be replaced, or recharged, almost immediately after a drop in voltage. If the battery cell is not replaced, or charged, immediately, the cell will quickly cease to provide any useful energy. Additionally, a cell's voltage that has dropped to zero and is continuing to be used may result in the failure in the cell itself.

In either event, a voltage drop, due to a discharged cell or a failure in the cell, may also adversely impact the rest of the cells in multi-cell battery, contributing to additional failures. Additionally, current energy systems utilizing multi-cell battery packs consider the battery pack as the lowest level field replaceable unit. Thus a failure in one or more (but not all) of the cells in the battery pack will necessitate a replacement of the entire battery pack even if the remaining "good" cells may still have sufficient energy capacity to continue providing power to a load.

Accordingly, what is needed in the art is an improved multi-cell battery system that mitigates the above-discussed limitations in the prior art. More specifically, what is needed in the art is a multi-cell battery system with improved reliability and longer life cycle.

SUMMARY OF THE INVENTION

It is therefore an object of the invention to provide an improved multi-cell battery.

It is another object of the invention to provide an active bypass circuit for use with a multi-cell battery and a method of operation thereof.

To achieve the foregoing objects, and in accordance with the invention as embodied and broadly described herein, an active bypass circuit for use with a battery pack having a plurality of cells is disclosed. The active bypass circuit includes a first switching device that is series-coupled with a cell in the battery pack (a separate active bypass circuit is utilized for each cell in the battery pack). A second switching device is parallel-coupled across the first switching device and the cell. The first and second switching devices are switched, i.e., turned ON and OFF, in a complementary fashion. The active bypass circuit also includes a monitoring circuit for monitoring an electrical characteristic of the cell and generating a switching control signal, in response to the monitored electrical characteristic, to selectively control the operation of the first and second switching devices. In an advantageous embodiment, the electrical characteristic is a voltage across the cell. In a related embodiment, the active bypass circuit also includes a switching driver circuit that receives the switching control signal from the monitoring circuit and generates, in response thereto, complementary first and second switching signals to the first and second switching devices, respectively.

The present invention discloses a novel active management circuit for use in batteries utilizing multiple series-couple energy cells to increase the overall operational lifetime of the batteries. The utilization of the novel active bypass circuit of the present invention results in shifting the basic, or lowest level, failure point from the first failure of a cell to the overall composite energy stored in the battery. This results in extending the energy providing capacity and improving the overall operational lifetime of the multi-cell battery. By analogy, the present invention is similar to the concept of redundant arrays of inexpensive disks (RAID) utilized in computer server systems. By shifting the lowest identified replacement, or failure, module away from the individual cell, the device with the highest failure rate is no longer the limiting factor. This results in significantly improving the reliability and, ultimately, lowering the cost of operation of a multi-cell battery.

In another embodiment of the present invention, the monitoring circuit includes an operational amplifier (op-amp), configured as a comparator, and a voltage reference. The switching control signal generated by the monitoring circuit is utilized, in an advantageous embodiment, to control the operation of the first and second switching devices that are n-channel and p-channel metal-oxide-semiconductor field effect transistors (MOSFETs), respectively. Those skilled in the art should readily appreciate that, in other advantageous embodiments, the switching devices may be insulated gate bipolar transistors (IGBTs) or relay-type devices. The present invention does not contemplate limiting its practice to any one type of switching device.

In yet another embodiment of the present invention, the switching driver circuit utilizes an inverter to generate the complementary switching signals. Alternatively, in other advantageous embodiments, a flip-flop device, such as a D-type flip-flop, may be employed to generate the complementary switching signals for the first and second switching devices. In a related embodiment, the first and second switching devices are metal-oxide-semiconductor field effect transistors (MOSFETs).

The foregoing description has outlined, rather broadly, preferred and alternative features of the present invention so that those skilled in the art may better understand the detailed description of the invention that follows. Additional features of the invention will be described hereinafter that form the subject matter of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
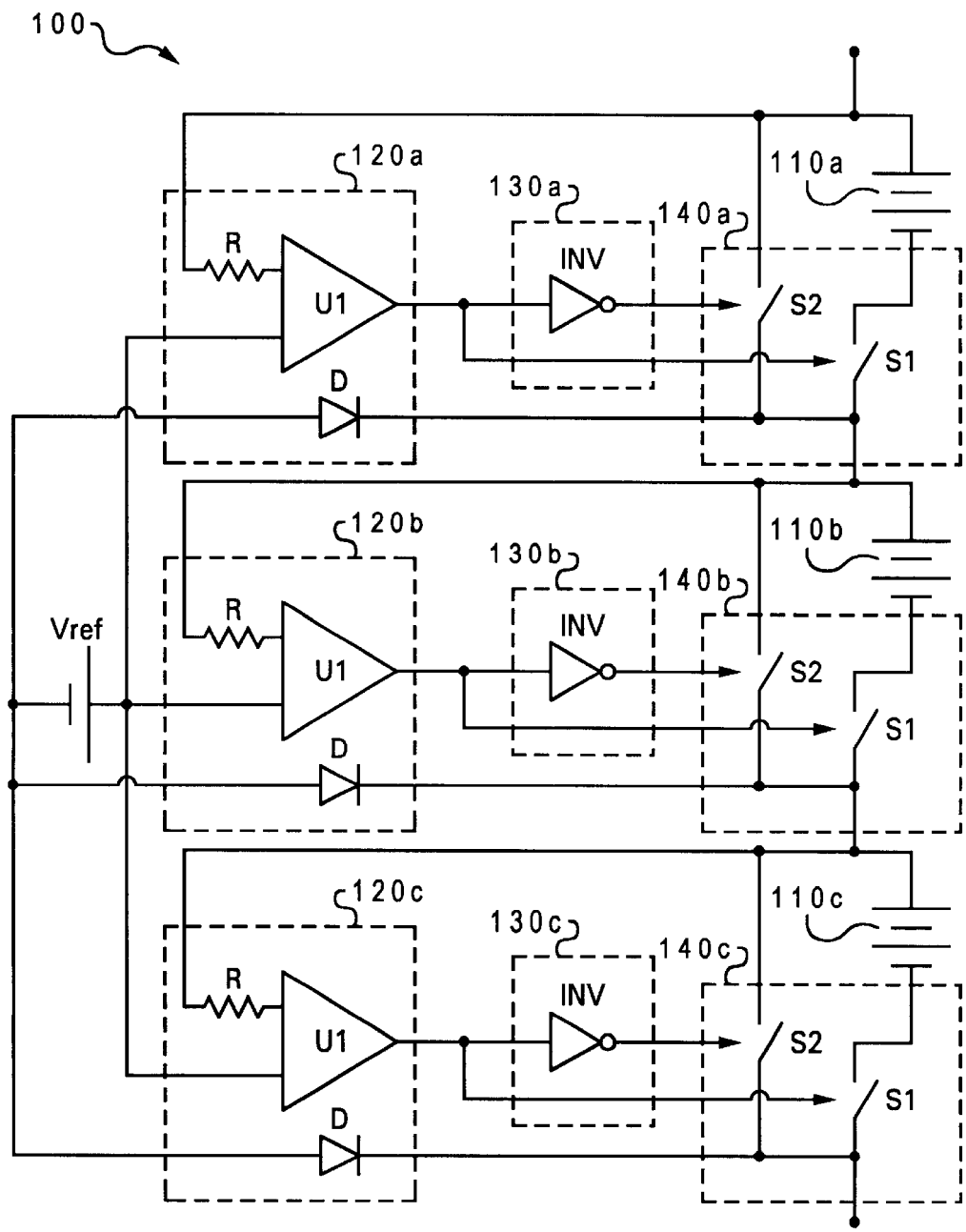
FIG. 1 illustrates an embodiment of a multi-cell battery utilizing a plurality of active bypass circuits according to the principles disclosed by the present invention.

With reference now to the figures and in particular with reference to FIG. 1, there is depicted an embodiment of a multi-cell battery 100 utilizing a plurality of active bypass circuits according to the principles disclosed by the present invention. Multi-cell battery 100 includes a plurality of individual cells, generally designated first, second and third cells 110a, 110b, 110c, respectively. Although multi-cell battery 100 is shown with only three individual cells, those skilled in the art should readily appreciated that the present invention may be practiced with batteries with more than one cell. Multi-cell battery 100 also includes a plurality of active bypass circuits; in a preferred embodiment, there is one active bypass circuit for each individual cell.

In the illustrated embodiment, each active bypass circuit associated with first, second and third cells 110a, 110b, 110c includes a switching circuit, generally designated 140, a monitoring circuit, generally designated 120 and a switching driver circuit, generally designated 130. Thus, for example, the active bypass circuit associated with first cell 110a includes first switching circuit 140a, first monitoring circuit 120a and first switching driver circuit 130a. It should be noted that the construction and operation of the active bypass circuits are analogous and, for ease of explanation, only the active bypass circuit associated with the first cell 110a will be described in detail.

First switching circuit 140a includes a first switching device S1 that is series-coupled with first cell 110a. In an advantageous embodiment, switching device S1 is a field effect transistor (FET) such as a metal-oxide-semiconductor field effect transistor (MOSFET) configured to operate as a switch. Switching device S1, in normal operation, is turned ON, i.e., conducting, permitting the voltage across first cell 110a to be included in the total voltage output of battery 100. A second switching device S2, analogous to first switching device S1, is parallel-coupled across first cell 110a and first switching device S1 to provide a "bypass" conduction path across first cell 110a. In normal operation, second switching device S2 is operated in a complementary manner with first switching device S1. Consequently, second switching device S2 is turned OFF, i.e., not conducting, when first cell 110a is functionally normally. Those skilled in the art should readily appreciate that, in other advantageous embodiments, the switching devices may be insulated gate bipolar transistors (IGBTs) or relay-type devices. The present invention does not contemplate limiting its practice to any one type of switching device.

First monitoring circuit 120a is utilized to monitor an electrical characteristic of first cell 110a and to generate a switching control signal in accordance with a measured electrical characteristic of first cell 110a. In an advantageous embodiment, the electrical characteristic being monitored is the voltage across first cell 110a. It should be readily apparent to those skilled in the art that other electrical characteristics of the monitored cell, such as a current, may also be utilized to provide an indication of the condition of the cell. In the illustrated embodiment, first monitoring circuit 120a includes a operational amplifier (op-amp) U1 configured as a comparator with a resistor R coupling a positive terminal of first cell 110a to the inverting node of op-amp U1. A voltage reference source Vref is coupled to the non-inverting node of op-amp U1 to provide a comparison means for determining the operational status of first cell 110a. The value of voltage reference source Vref is selected depending on the type of cell utilized in multi-cell battery 100. Generally, the voltage reference value selected is the voltage, measured across a single cell, that indicates that the cell has failed or has no useful charge, i.e., energy, remaining. It should be noted that the negative terminal of voltage reference source Vref is floating, i.e., not tied to ground, and a blocking diode D is coupled between the negative potential of voltage reference source Vref and the positive terminal of first cell 110a via first switching device S1.

First switching driver circuit 130a is coupled to first monitoring circuit 120a and includes, in an advantageous embodiment, an inverter 130a. First switching driver circuit receives the switching control signal generated by first monitoring circuit 120a and generates, in turn, complementary switching signals for controlling the operation of first and second switching devices S1, S2. The operation of the active bypass circuit is relatively straight forward and is described in greater detail hereinafter with respect to a single cell, i.e., first cell 110a.

Initially, the voltage across first cell 110a is greater than voltage reference source Vref. Consequently, the output of op-amp U1 is high driving first switching device S1 ON and second switching device S2 OFF. As long as first cell 110a is functioning well, i.e., its voltage output is constant at its rated voltage level, first switching device S1 will remain ON and second switching device will be turned OFF. In the event that first cell 110a voltage drops below voltage reference source Vref, for example, due to a discharged cell or a failure in the cell, the output of op-amp U1 goes low and first switching driver circuit 130a, in turn, generates a low and high driving signals to first and second switching devices S1, S2, respectively, turning OFF first switching device S1 and turning ON second switching device S2. With this switching arrangement, first cell 110a is "shorted," effectively removing first cell 110a from the rest of the cells in multi-cell battery 100 and precluding first cell 110a from adversely affecting the rest of the cells.

The active bypass circuit of the present invention results in shifting the basic, or lowest level, failure point from the first failure of a cell to the overall composite energy stored in multi-cell battery 100. This results in extending the energy providing capacity and improving the overall operational lifetime of multi-cell battery 100. By analogy, the present invention is similar to the concept of redundant arrays of inexpensive disks (RAID) utilized in computer server systems. By shifting the lowest identified replacement, or failure, module away from the individual cell, the device with the highest failure rate is no longer the limiting factor. This results in significantly improving the reliability and, ultimately, lower cost of operation of a multi-cell battery.

Figure 2A:
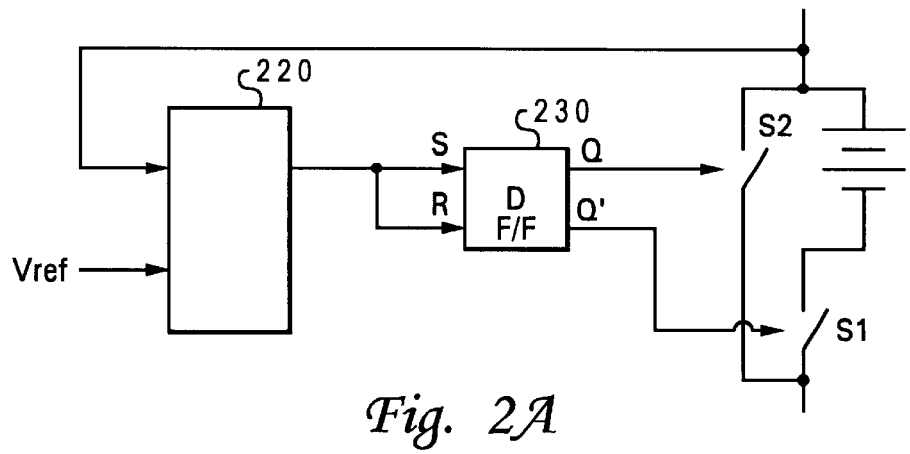
FIG. 2A illustrates an active bypass circuit employing a D flip-flop device for generating the complementary switching signals for first and second switching devices.
Figure 2B:
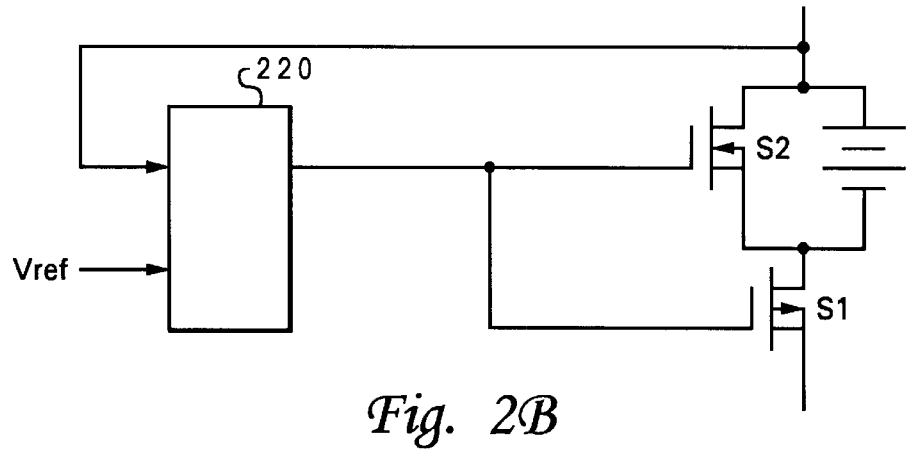
FIG. 2B illustrates utilizing a p-type MOSFET and an n-type MOSFET devices for first and second switching devices.
Figure 2C:
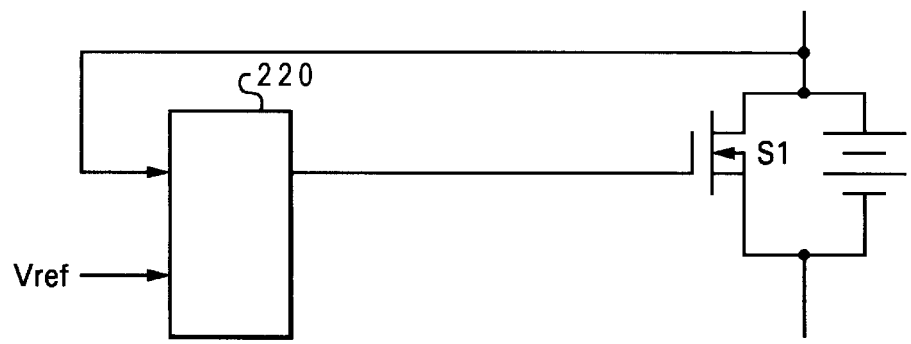
FIG. 2C illustrates an embodiment of an active bypass circuit where only a single switching device S1 is utilized to bypass the associated cell.

In alternate embodiments, as illustrated in FIGS. 2A through 2C, different switching schemes may be utilized for the switching driver circuit and associated switching devices. FIG. 2A depicts an active bypass circuit employing a D flip-flop device for generating the complementary switching signals for first and second switching devices S1, S2. FIG. 2B illustrates utilizing a p-type MOSFET and an n-type MOSFET devices for first and second switching devices S1, S2. Utilizing a pair of n and p type MOSFETs eliminates the need for a switching driver circuit since complementary driving signals are not needed to operate first and second switching devices S1, S2 in a complementary manner. FIG. 2C depicts an embodiment of an active bypass circuit where only a single switching device S1 is utilized to bypass the associated cell. It should be noted that this embodiment is suitable for battery cell chemistries that allow a cell to be shorted to zero. Furthermore, when utilizing this particular embodiment, care should be taken to ensure that the switching driver circuitry that turns ON switching device S1 does so at a rate such that the transistor does nor overheat.

While the invention has been particularly shown and described with reference to a preferred and alternate embodiments, it will be understood by those skilled in the art that various changes in form and detail may be made therein without departing from the spirit and scope of the invention.

What is claimed is:

1. An active bypass circuit for use with a battery pack having a plurality of cells, comprising:
    a first switching device series-coupled with a cell;
    a second switching device parallel-coupled across said first switching device and said cell, wherein said first and second switching devices are operable in a complementary fashion; and
    a monitoring circuit for monitoring an electrical characteristic of said cell and generating a switching control signal to selectively control the operation of said first and second switching devices.

2. The active bypass circuit as recited in claim 1, wherein said monitoring circuit includes:
    a comparator; and
    a voltage reference.

3. The active bypass circuit as recited in claim 1, wherein said first and second switching devices are n-channel and p-channel metal-oxide-semiconductor field effect transistors (MOSFETs), respectively.

4. The active bypass circuit as recited in claim 1, further comprising a switching driver circuit that receives said switching control signal from said monitoring circuit and generates, in response thereto, complementary first and second switching signals to said first and second switching devices, respectively.

5. The active bypass circuit as recited in claim 4, wherein said first and second switching devices are metal-oxide-semiconductor field effect transistors (MOSFETs).

6. The active bypass circuit as recited in claim 4, wherein said switching driver circuit includes an inverter.

7. The active bypass circuit as recited in claim 4, wherein said switching driver circuit includes a flip-flop device.

8. The active bypass circuit as recited in claim 2, wherein said electrical characteristic is a voltage across said cell.

9. A method for extending energy capacity and operation life of a battery pack having a plurality of cells, said method comprising the steps of:
    monitoring an electrical characteristic of each of said plurality of cells;
    comparing said electrical characteristics to a reference electrical characteristic; and
    bypassing a cell in response to said cell electrical characteristic being lower than said reference electrical characteristic, said step of bypassing a cell including:
        series-coupling a first switching device with said cell; and
        parallel-coupling a second switching device across said first switching device and said cell, wherein said first and second switching devices are operable in a complementary fashion.

10. The method as recited in claim 9, wherein said step of bypassing a cell includes the step turning off said first switching device and turning on said second switching device.

11. The method as recited in claim 9, wherein said electrical characteristic is a voltage across each of said plurality of cells.

12. A battery pack, comprising:
    a plurality of cells, wherein each of said plurality of cells having an active bypass circuit, said active bypass circuit including:
        a first switching device series-coupled with said associated cell;
        a second switching device parallel-coupled across said first switching device and said cell, wherein said first and second switching devices are operable in a complementary fashion; and
        a monitoring circuit for monitoring an electrical characteristic of said cell and generating a switching control signal to selectively control the operation of said first and second switching devices.

13. The battery pack as recited in claim 12, wherein said monitoring circuit includes:
    a comparator; and
    a voltage reference.

14. The battery pack as recited in claim 12, wherein said first and second switching devices are n-channel and p-channel metal-oxide-semiconductor field effect transistors (MOSFETs), respectively.

15. The battery pack as recited in claim 12, further comprising a switching driver circuit that receives said switching control signal from said monitoring circuit and generates, in response thereto, complementary first and second switching signals to said first and second switching devices, respectively.

16. The battery pack as recited in claim 15, wherein said first and second switching devices are metal-oxide-semiconductor field effect transistors (MOSFETs).

17. The battery pack as recited in claim 15, wherein said switching driver circuit includes an inverter.

18. The battery pack as recited in claim 15, wherein said switching driver circuit includes a flip-flop device.

19. The battery pack as recited in claim 13, wherein said electrical characteristic is a voltage across said cell.

* * * * *